(12) United States Patent
Li

(10) Patent No.: US 12,207,035 B2
(45) Date of Patent: Jan. 21, 2025

(54) EARPHONE CASE AND WIRELESS EARPHONE

(71) Applicant: BEIJING XIAOMI MOBILE SOFTWARE CO., LTD., Beijing (CN)

(72) Inventor: Shibo Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 238 days.

(21) Appl. No.: 17/876,137

(22) Filed: Jul. 28, 2022

(65) Prior Publication Data

US 2023/0308795 A1    Sep. 28, 2023

(30) Foreign Application Priority Data

Mar. 23, 2022  (CN) .......................... 202220659498.2

(51) Int. Cl.
    *H04R 1/10*    (2006.01)
(52) U.S. Cl.
    CPC ......... *H04R 1/1025* (2013.01); *H04R 1/1016* (2013.01); *H04R 2420/07* (2013.01)
(58) Field of Classification Search
    CPC . H04R 1/1025; H04R 1/1016; H04R 2420/07
    USPC ...................................................... 381/380
    See application file for complete search history.

(56) References Cited

U.S. PATENT DOCUMENTS

| 5,531,345 | A   | * | 7/1996  | Nakamura .............. H02G 3/14 |
|           |     |   |         |                         220/326 |
| 11,115,746 | B1 | * | 9/2021  | Morrison ............ H04R 1/1025 |
| 11,528,973 | B1 | * | 12/2022 | Tharrett ............... H02J 7/0044 |
| 2017/0094399 | A1 | * | 3/2017 | Chandramohan ...... H04R 5/033 |
| 2018/0152778 | A1 | * | 5/2018 | Du ........................ H04R 1/1016 |
| 2020/0084532 | A1 | * | 3/2020 | Lo ........................ H04R 1/1016 |
| 2020/0221212 | A1 |   | 7/2020 | Xu et al. |
| 2021/0289282 | A1 |   | 9/2021 | Onizuka et al. |

OTHER PUBLICATIONS

European Patent Application No. 22187828.3, extended Search and Opinion dated Jun. 1, 2023, 8 pages.

* cited by examiner

*Primary Examiner* — Katherine A Faley
(74) *Attorney, Agent, or Firm* — Cozen O'Connor

(57) ABSTRACT

An earphone case includes an upper housing and a lower housing. The upper housing is connected to the lower housing, the lower housing has a first accommodating groove and a second accommodating groove, the first accommodating groove and the second accommodating groove are configured to accommodate a left earphone and a right earphone, respectively, and each of the first accommodating groove and the second accommodating groove has at least a top opening and a side opening. The lower housing includes a plurality of attraction members corresponding to each of the first accommodating groove and the second accommodating groove in terms of positions, the attraction members corresponding to the first accommodating groove are configured to attract a stem of the left earphone, and the attraction members corresponding to the second accommodating groove are configured to attract a stem of the right earphone.

16 Claims, 2 Drawing Sheets

EARPHONE CASE AND WIRELESS EARPHONE

CROSS-REFERENCE TO RELATED APPLICATION

This application is based on and claims priority to the Chinese Patent Application No. 202220659498.2 filed on Mar. 23, 2022, the entire contents of which are incorporated herein by reference.

BACKGROUND

A wireless earphone (a true wireless stereo earphone, i.e. a TWS earphone) is generally equipped with a charging case for storage and charging due to its compact structure and small size. The charging case generally has a profiled sink groove matched with an outer shape of an earphone body, so as to ensure the stability of an electrical connection when charging the earphone.

SUMMARY

The present disclosure relates to a field of electronic devices, and more particularly, to an earphone case and a wireless earphone.

Embodiments of the present disclosure provide an earphone case, which includes an upper housing and a lower housing. The upper housing is connected to the lower housing, the lower housing has a first accommodating groove and a second accommodating groove, the first accommodating groove and the second accommodating groove are configured to accommodate a left earphone and a right earphone, respectively, and each of the first accommodating groove and the second accommodating groove has at least a top opening and a side opening. The lower housing comprises a plurality of attraction members corresponding to each of the first accommodating groove and the second accommodating groove, the attraction members corresponding to the first accommodating groove are configured to attract a stem of the left earphone, and the attraction members corresponding to the second accommodating groove are configured to attract a stem of the right earphone.

DETAILED DESCRIPTION

Figure 1:
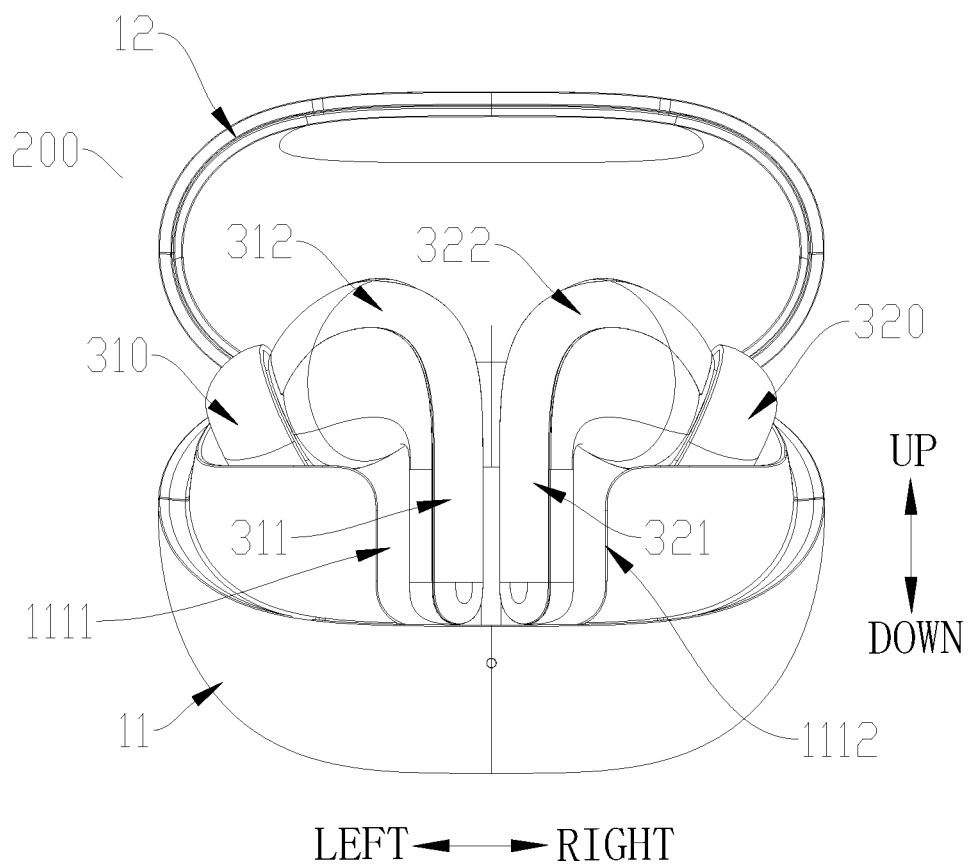
FIG. 1 is a schematic view of a wireless earphone according to an embodiment of the present disclosure.

Embodiments of the present disclosure are described in detail below, and examples of the described embodiments are shown in accompanying drawings. The following embodiments described with reference to the accompanying drawings are exemplary and are intended to explain the present disclosure, rather than limit the present disclosure.

A charging case fitted with a rod-shaped TWS earphone may have a profiled groove in an inner shell to accommodate the earphone. However, the profiled groove of this charging case may be deep, and a traveled distance is large when the earphone is taken and placed. When an opening angle of a flappable cover of the charging case is not large enough, the flappable cover affects the taking and placing of the earphone. In addition, since a rod of the earphone is fitted in the profiled groove, the earphone can only move along an axial direction of the rod with a small degree of freedom. When the earphone is to be taken out, only an upper half of a head of the earphone can be grasped. When the earphone is to be placed, a bottom of the rod of the earphone needs to be aligned with an opening of the profiled groove, which affects the user's experience.

An earphone case 100 and a wireless earphone 200 according to embodiments of the present disclosure are described below according to FIGS. 1 to 4. The wireless earphone 200 includes the earphone case 100 and a wireless earphone body. The wireless earphone body includes a left earphone 310 and a right earphone 320, and the earphone case 100 is configured to accommodate the wireless earphone body.

The earphone case 100 includes a lower housing 11 and an upper housing 12. The upper housing 12 is flippably connected to the lower housing 11 so that the upper housing 12 is flippable between an open position and a closed position. In some embodiments, the upper housing 12 is hinged with the lower housing 11.

In the closed position, the upper housing 12 and the lower housing 11 define an accommodating cavity for accommodating the wireless earphone body. The lower housing 11 has a first accommodating groove 1111 and a second accommodating groove 1112, and the first accommodating groove 1111 and the second accommodating groove 1112 are configured to accommodate the left earphone 310 and the right earphone 320, respectively. The first accommodating groove 1111 and the second accommodating groove 1112 each have an opening at least in a top face and a side face. That is, the first accommodating groove 1111 and the second accommodating groove 1112 each have at least a top opening and a side opening. The top opening is conducive to grasping an ear bud of the earphone, and the side opening is conducive to grasping a stem of the earphone.

The lower housing 11 includes a plurality of attraction members corresponding to each of the first accommodating groove 1111 and the second accommodating groove 1112. The attraction members corresponding to the first accommodating groove 1111 are configured to attract a stem 311 of the left earphone 310, and the attraction members corresponding to the second accommodating groove 1112 are configured to attract a stem 321 of the right earphone 320.

The lower housing of the earphone case according to the present disclosure is a semi-open structure, and the accommodating groove for accommodating the earphone is defined in the lower housing. The accommodating groove has the opening at least in the top face and the side face, so that the earphone can be taken out and placed from the top and side and the process of taking and placing is convenient. In conjunction with the plurality of attraction members in the lower housing, the stem of the earphone can be attracted stably without enclosing too many areas of the earphone, so that an exposed portion of the earphone can be enlarged, thus improving the user's experience in the actual taking process.

Moreover, the accommodating groove is located at an edge of the lower housing, that is, the accommodating groove is adjacent to the edge of the lower housing and extends from the edge of the lower housing, so that a limiting structure of the earphone case is simplified, an internal space of the earphone case can be utilized to a maximum extent, and hence the structure of the earphone case is compact, thus miniaturizing the product, making the product easy to carry, and meeting the actual use needs of TWS products.

The wireless earphone 200 in a specific embodiment according to the present disclosure is described below according to FIGS. 1 to 4.

As shown in FIG. 1, the wireless earphone 200 includes an earphone case 100, a left earphone 310, and a right earphone 320. The left earphone 310 includes a left stem 311 and a left ear bud 312, and the right earphone 320 includes a right stem 321 and a right ear bud 322.

Figure 4:
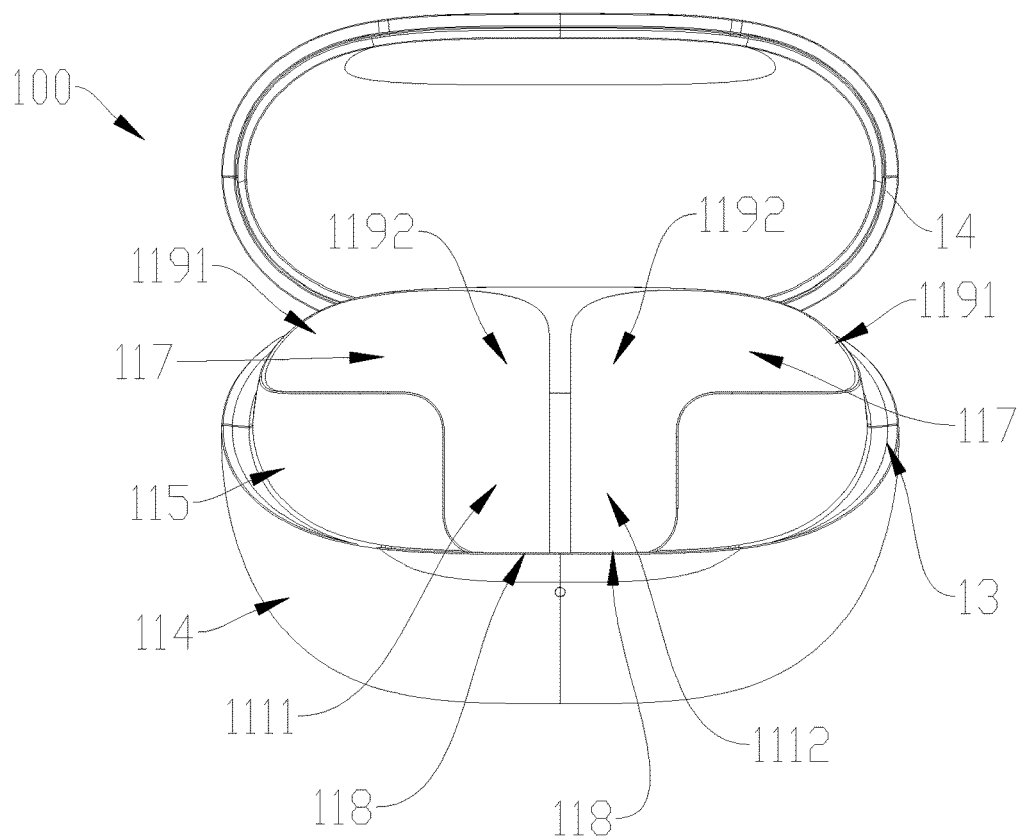
FIG. 4 is a schematic view of an earphone case according to an embodiment of the present disclosure.

The earphone case 100 includes a lower housing 11 and an upper housing 12, and the upper housing 12 is hinged with the lower housing 11 so that the upper housing 12 is flippable between an open position and a closed position. As shown in FIG. 4, the lower housing 11 is a semi-open structure, and has a first accommodating groove 1111 and a second accommodating groove 1112 distributed in a left-right direction (as shown by the arrow in FIG. 1). The first accommodating groove 1111 on a left side is configured to accommodate the left earphone 310, and the second accommodating groove 1112 on a right side is configured to accommodate the right earphone 320. Both the first accommodating groove 1111 and the second accommodating groove 1112 have a top opening and a side opening.

Figure 2:
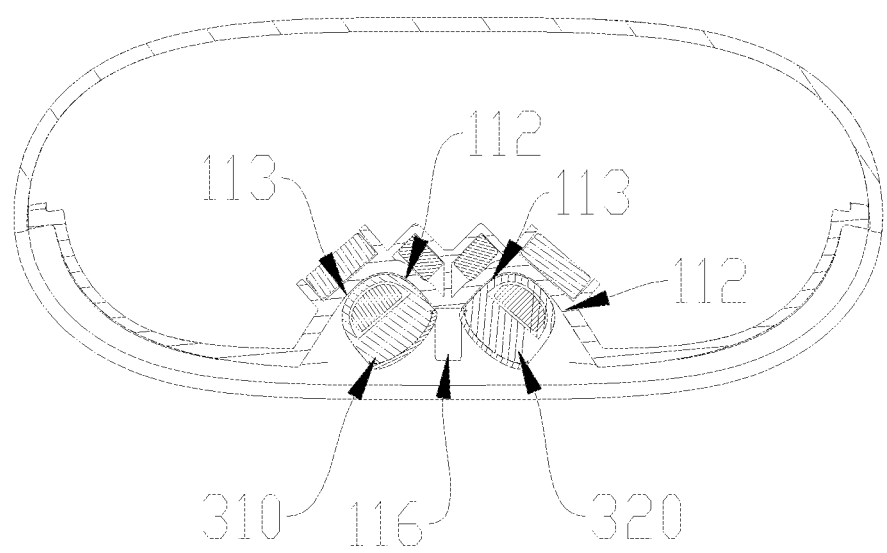
FIG. 2 is a sectional view of a wireless earphone according to an embodiment of the present disclosure.

As shown in FIG. 2, a side wall face of each of the first accommodating groove 1111 and the second accommodating groove 1112 includes a first side wall face 112 and a second side wall face 113 connected with each other. The first side wall face 112 and the second side wall face 113 of the first accommodating groove 1111 intersect with each other to form a certain included angle, and the first side wall face 112 and the second side wall face 113 of the second accommodating groove 1112 also intersect with each other to form a certain included angle.

Taking the first accommodating groove 1111 as an example, the first side wall face 112 faces a first direction, i.e., the first side wall face 112 is perpendicular to the first direction, and the second side wall face 113 faces a second direction, i.e., the second side wall face 113 is perpendicular to the second direction. In order to make the technical solution clearer, a depth direction of the first accommodating groove 1111 is defined as an X direction, the first direction is defined as a Y direction, and the second direction is defined as a Z direction. It can be understood that a horizontal plane where the Y direction and the Z direction are located is perpendicular to the X direction.

In some embodiments, an included angle between the first direction and the second direction is greater than or equal to 60° and less than or equal to 120°. If the included angle between the first direction and the second direction is less than 60°, the side opening of the first accommodating groove 1111 is not large enough, so that the taking and placing of the left earphone 310 at the side of the first accommodating groove 1111 is limited by the lower housing 111, thus affecting the sense of experience. If the included angle between the first direction and the second direction is greater than 120°, the side opening of the first accommodating groove 1111 is too large, so that the positioning of the stem in the accommodating groove 111 is unstable.

In this embodiment, the included angle between the first direction and the second direction is 90°, i.e., the X direction, the Y direction and the Z direction are perpendicular to each other. Therefore, the positioning and limiting of the stem in the first accommodating groove 1111 are more stable while the left earphone 320 can be taken out and placed more conveniently.

It can be understood that a structure of the side wall face of the second accommodating groove 1112 can refer to the above structure of the side wall face of the first accommodating groove 1111, which will not be repeated here.

Figure 3:
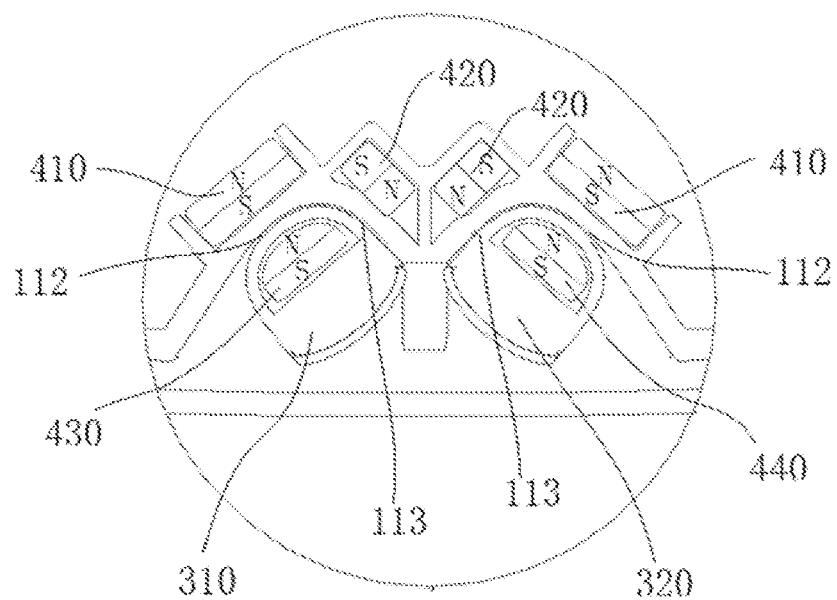
FIG. 3 is a partially enlarged view of FIG. 2.

As shown in FIG. 3, the attraction member includes a first attraction member 410 and a second attraction member 420. The first attraction member 410 is opposite to the first side wall face 112 of the first accommodating groove 1111 or the first side wall face 112 of the second accommodating groove 1112, and configured to attract the stem of the corresponding earphone in the first direction. The second attraction member 420 is opposite to the second side wall face 113 of the first accommodating groove 1111 or the second side wall face 113 of the second accommodating groove 1112, and configured to attract the stem of the corresponding earphone in the second direction. For example, the first attraction member 410 and the second attraction member 420 are inside the lower housing 11 and outside the first accommodating groove 1111 or the second accommodating groove 1112, and surround the first accommodating groove 1111 or the second accommodating groove 1112.

In some embodiments, the attraction member corresponding to the first accommodating groove 1111 and the attraction member corresponding to the second accommodating groove 1112 are mirror-symmetrical. That is, the first attraction member 410 corresponding to the first accommodating groove 1111 and the first attraction member 410 corresponding to the second accommodating groove 1112 are mirror-symmetrical, and the second attraction member 420 corresponding to the first accommodating groove 1111 and the second attraction member 420 corresponding to the second accommodating groove 1112 are mirror-symmetrical.

In embodiments, the attraction member is a magnet, and magnetic poles of the attraction member corresponding to the first accommodating groove 1111 and magnetic poles of the attraction member corresponding to the second accommodating groove 1112 are also mirror-symmetrical. That is, magnetic poles of the first attraction member 410 corresponding to the first accommodating groove 1111 and magnetic poles of the first attraction member 410 corresponding to the second accommodating groove 1112 are also mirror-symmetrical, and magnetic poles of the second attraction member 420 corresponding to the first accommodating groove 1111 and magnetic poles of the second attraction member 420 corresponding to the second accommodating groove 1112 are also mirror-symmetrical.

As shown in FIG. 3, in this embodiment, one first attraction member 410 and one second attraction member 420 correspond to the first accommodating groove 1111, and one first attraction member 410 and one second attraction member 420 correspond to the second accommodating groove 1112. That is, the first accommodating groove 1111 is correspondingly provided with one first attraction member 410 and one second attraction member 420, and the second accommodating groove 1112 is correspondingly provided with one first attraction member 410 and one second attraction member 420.

Further, a position and magnetic poles of the first attraction member 410 corresponding to the first accommodating groove 1111 and a position and magnetic poles of the first attraction member 410 corresponding to the second accommodating groove 1112 are mirror-symmetrical. A position and magnetic poles of the second attraction member 420 corresponding to the first accommodating groove 1111 and a position and magnetic poles of the second attraction member 420 corresponding to the second accommodating groove 1112 are mirror-symmetrical.

Specifically, as shown in FIG. 3, taking the first attraction member 410 and the second attraction member 420 corresponding to the first accommodating groove 1111 on the left side as an example, a magnetic pole direction of the first attraction member 410 is perpendicular to a plane of the first side wall face 112, so that a first magnetic pole (an S pole in FIG. 3) of the first attraction member 410 faces toward the side opening and a second magnetic pole (a N pole in FIG. 3) of the first attraction member 410 faces away from the side opening. In other words, the first magnetic pole of the first attraction member 410 is closer to the first side wall face 112 than the second magnetic pole of the first attraction member 410. A magnetic pole direction of the second attraction member 420 is parallel to a plane of the second side wall face 113, so that both a first magnetic pole (an S pole in FIG. 3) and a second magnetic pole (a N pole in FIG. 3) of the second attraction member 420 have a side facing toward the side opening. It can be understood that magnetic pole directions of the first attraction member 410 and the second attraction member 420 corresponding to the second accommodating groove 1112 on the right side can refer to the first accommodating groove 1111, which will not be repeated here.

Further, as shown in FIG. 2, the lower housing 11 has a boss 116, and the boss 116 is between the first accommodating groove 1111 and the second accommodating groove 1112, so as to partially separate the first accommodating groove 1111 from the second accommodating groove 1112.

As shown in FIG. 4, each of the first accommodating groove 1111 and the second accommodating groove 1112 has a first bottom wall face 117 and a second bottom wall face 118. The first bottom wall face 117 of the first accommodating groove 1111 is flush with the first bottom wall face 117 of the second accommodating groove 1112, and the second bottom wall face 118 of the first accommodating groove 1111 is flush with the second bottom wall face 118 of the second accommodating groove 1112.

As shown in FIGS. 1 and 4, the first bottom wall face 117 of the first accommodating groove 1111 is higher than the second bottom wall face 118 of the first accommodating groove 1111, the first bottom wall face 117 of the first accommodating groove 1111 is configured to abut with the left ear bud 312 of the left earphone 310, and second bottom wall face 118 of the first accommodating groove 1111 is configured to support a bottom of the left stem 311 of the left earphone 310. The first bottom wall face 117 of the second accommodating groove 1112 is higher than the second bottom wall face 118 of the second accommodating groove 1112, the first bottom wall face 117 of the second accommodating groove 1112 is configured to abut with the right ear bud 322 of the right earphone 320, and the second bottom wall face 118 of the second accommodating groove 1112 is configured to support a bottom of the stem 321 of the right earphone 320. Thus, the left earphone 310 and the right earphone 320 can be placed in the earphone case 100 stably.

Further, in other embodiments, the attraction member may also be arranged at a position corresponding to the first bottom wall face 117, so as to attract the left ear bud 312 of the left earphone 310 or the right ear bud 322 of the right earphone 320, thus further improving the attraction stability of the earphone.

As shown in FIG. 4, in order to facilitate the user to take out and place the earphone, the top opening of each of the first accommodating groove 1111 and the second accommodating groove 1112 includes a first opening portion 1191 corresponding to the first bottom wall face 117 and a second opening portion 1192 corresponding to the second bottom wall face 118. An edge of the first opening portion 1191 is farther away from a central axis of the earphone case 100 than an edge of the second opening portion 1192, i.e., the first opening portion 1191 is farther away from the central axis of the earphone case 100 than the second opening portion 1192, so that the left stem 311 of the left earphone 310 is adjacent to the right stem 321 of the right earphone 320, and the left ear bud 312 faces away from the right ear bud 322, as shown in FIG. 1. In other words, a distance between the edge of the first opening portion 1191 and the central axis of the earphone case 100 is larger than a distance between the edge of the second opening portion 1192 and the central axis of the earphone case 100.

Further, as shown in FIG. 3, the left stem 311 has a first magnetic member 430 configured to attract the attraction members corresponding to the first accommodating groove 1111, and the right stem 321 has a second magnetic member 440 configured to attract the attraction members corresponding to the second accommodating groove 1112.

The first magnetic member 430 is configured to attract each of the first attraction member 410 and the second attraction member 420 corresponding to the first accommodating groove 1111, and the second magnetic member 440 is configured to attract each of the first attraction member 410 and the second attraction member 420 corresponding to the second accommodating groove 1112, thus reducing the number of parts, reducing the manufacturing difficulty, and reducing the weight of the earphone. In other embodiments, two first magnetic members 430 or two second magnetic members 440 may be provided, and are configured to attract the first attraction members 410 and the second attraction members 420 corresponding to the accommodating grooves, respectively, but this will increase the number of parts to a certain extent, increase the manufacturing difficulty, and increase the weight of the earphone. Therefore, it is preferred that the first magnetic member 430 attracts each of the first attraction member 410 and the second attraction member 420 corresponding to the first accommodating groove 1111, and the second magnetic member 440 attracts each of the first attraction member 410 and the second attraction member 420 corresponding to the second accommodating groove 1112.

In order to realize the stable positioning of the stem in the Z direction, the first attraction member 410 and the second attraction member 420 extend along the depth direction of the accommodating groove (i.e. the first accommodating groove 1111 and the second accommodating groove 1112), so that the first attraction member 410 and the second attraction member 420 have a certain length, and thus the first attraction member 410 and the second attraction member 420 generate an attraction force on the first magnetic member 430 across the depth direction of the first accommodating groove 1111 and an attraction force on the second magnetic member 440 across the depth direction of the second accommodating groove 1112. In some embodiments, the first magnetic member 430 and the second magnetic member 440 extend and have a certain length along the depth direction of the accommodating groove. Thus, the earphone body can be completely and accurately fixed in the earphone case 100. Moreover, through the attraction force between the first and second attraction members 410, 420 and the first magnetic member 430 as well as the attraction force between the first and second attraction members 410, 420 and the second magnetic member 440, the earphone body can be accurately attracted onto the earphone case 100 at a long distance, thus greatly improving the use experience of the earphone body in the process of taking and placing.

As shown in FIG. 3, the first magnetic pole (the S pole in FIG. 3) of the first attraction member 410 corresponding to the first accommodating groove 1111 on the left side is opposite to a first magnetic pole (a N pole in FIG. 3) of the first magnetic member 430, and the first magnetic pole (the S pole in FIG. 3) and the second magnetic pole (the N pole in FIG. 3) of the second attraction member 420 corresponding to the first accommodating groove 1111 are opposite to the first magnetic pole (the N pole in FIG. 3) and a second magnetic pole (an S pole in FIG. 3) of the first magnetic member 430, respectively. Similarly, a first magnetic pole (an S pole in FIG. 3) of the first attraction member 410 corresponding to the second accommodating groove 1112 on the right side is opposite to a first magnetic pole (a N pole in FIG. 3) of the second magnetic member 440, and a first magnetic pole (an S pole in FIG. 3) and a second magnetic pole (a N pole in FIG. 3) of the second attraction member 420 corresponding to the second accommodating groove 1112 are opposite to the first magnetic pole (the N pole in FIG. 3) and a second magnetic pole (an S pole in FIG. 3) of the second magnetic member 440, respectively.

Specifically, taking the first accommodating groove 1111 as an example, the first attraction member 410 and the second attraction member 420 corresponding to the first accommodating groove 1111 have an included angle of 90°, and the two magnetic poles of the first attraction member 410, the two magnetic poles of the first magnetic member 430 and the two magnetic poles of the second attraction member 420 are arranged along the first direction. Polarities of opposite magnetic poles of the first magnetic member 430 and the first attraction member 410 in the first direction are opposite, and polarities of two pairs of opposite magnetic poles of the first magnetic member 430 and the second attraction member 420 in the second direction are opposite.

Further, in other embodiments, a magnetic pole direction of the first magnetic member 430 may be opposite to a magnetic pole direction of the second magnetic member 440, so as to avoid misplacing the left earphone 310 and the right earphone 320 when they are placed.

In some embodiments, the first accommodating groove 1111 and the second accommodating groove 1112 are each a profiled groove, the left earphone 310 is fitted with a groove wall face of the first accommodating groove 1111 in a profiled manner, and the right earphone 320 is fitted with a groove wall face of the second accommodating groove 1112 in a profiled manner, so that the left earphone 310 and the right earphone 320 can be better fitted with the first accommodating groove 1111 and the second accommodating groove 1112, respectively.

When the upper housing 12 of the wireless earphone 200 according to this embodiment is in the closed position, the upper housing 12 covers an upper side and a front side of the accommodating groove. When the upper housing 12 is in the open position, the upper side and the front side of the accommodating groove are in an exposed state, and most of the structure of the wireless earphone body is exposed. At this time, the wireless earphone body can be taken out from three directions, namely, the X direction, the Y direction or the Z direction. Thus, the wireless earphone body is easy to take out and place without being blocked by the upper housing 12. Compared with a technical solution in the related art, in which the charging case adopts a structure of a profiled sink groove and the wireless earphone can only be pulled out upwards vertically, the overall structural design of the earphone case in this embodiment is more concise, it is more convenient to take out and place the earphone, the traveled distance for taking out and placing the earphone is greatly shortened, and the resistance is small. In addition, when the upper housing 12 is opened, more portions of the earphone are exposed, so that it is more convenient to pick up the earphone.

In this embodiment, as shown in FIG. 4, an outer edge of the lower housing 11 has a first fitting face 13, and the first fitting face 13 is oblique relative to a plane (a horizontal plane in FIG. 4) orthogonal to a height direction of the lower housing 11. For example, an upper edge portion of an outer surface of the lower housing 11 has the first fitting face 13. The upper housing 12 has a second fitting face 14, and the second fitting face 14 may be fitted with the first fitting face 13. Moreover, when the first fitting face 13 is fitted with the second fitting face 14, the first fitting face 13 is parallel to the second fitting face 14, so that a good fit can be formed between the upper housing 12 and the lower housing 11.

Further, in order to avoid sliding between the upper housing 12 and the lower housing 11, the first fitting face 13 is inclined downwards in an inward direction, and the second fitting face 14 is fitted with the first fitting face 13.

In some embodiments, as shown in FIG. 4, the lower housing 11 includes an outer shell 114 and a middle shell 115, the middle shell 115 is in the outer shell 114, and the first accommodating groove 1111 and the second accommodating groove 1112 are both defined in the middle shell 115. The first fitting face 13 is inclined from the outer shell 114 to the middle shell 115 from top to bottom. An opening of the outer shell 114 faces upwards and forwards. An opening shape of the outer shell 114 is adapted to an opening shape of the upper housing 12, so that the upper housing 12 is closed with the outer shell 114 in the closed position, and the upper housing 12 is movably connected to a rear edge of the opening of the outer shell 114.

That is, the upper housing 12 is movably arranged at the rear edge of the opening of the outer shell 114, and the upper housing 12 may turn forth and back by using the rear edge of the outer shell 114 as a support point. Moreover, the outer shell 114 has an opening with a certain slope, and the upper housing 12 has a covering opening corresponding to the opening. When the upper housing 12 is snapped on the outer shell 114, the covering opening is just tightly snapped on the opening, so that an enclosed space is defined between the upper housing 12 and the outer shell 114 for storing the wireless earphone body, so as to avoid the loss of the wireless earphone body.

A front edge of the opening of the outer shell 114 is located below the rear edge of the opening of the outer shell 114, a left edge and a right edge of the opening of the outer shell 114 both extend forwards and downwards from the rear edge, and the left edge and the right edge of the opening of the outer shell 114 are parallel to each other. That is, a height of the front edge of the outer shell 114 is lower than a height of the rear edge of the outer shell 114, the opening with the certain slope is defined between the rear edge of the outer shell 114 and the front edge of the outer shell 114, and the left edge and the right edge of the opening of the outer shell 114 are in a same slope surface.

To sum up, the earphone case according to the embodiments of the present disclosure adopts a semi-open design, and the limiting structure is simplified, thus making the earphone more compact and improving the space utilization rate of the earphone case. After a upper housing of the earphone case is opened, the earphone body is fully exposed, thus increasing the grabbing area. Moreover, barrier free grabbing can be realized in the X direction, the Y direction and the Z direction. Through the attraction of the plurality of attraction members, the wireless earphone body can be accurately attracted onto the earphone case at a long distance, and can be firmly attracted in the earphone case, thus greatly improving the use experience of the wireless earphone body in the process of taking and placing.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features associated with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "interconnected," "connected," "fixed" and the like are used broadly, and may be, for example, fixed connections, detachable connections, or integral connections; may also be mechanical or electrical connections or intercommunication; may also be direct connections or indirect connections via intervening structures; may also be inner communications or interactions of two elements. For those skilled in the art, the specific meaning of the above terms in the present disclosure can be understood according to the specific circumstances.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an intermediate medium formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example" or "some examples" means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation to the present disclosure, and changes, modifications, alternatives and variations can be made in the above embodiments within the scope of the present disclosure.

What is claimed is:

1. An earphone case, comprising:
an upper housing; and
a lower housing, the upper housing being connected to the lower housing, the lower housing having a first accommodating groove and a second accommodating groove, the first accommodating groove and the second accommodating groove being configured to accommodate a left earphone and a right earphone, respectively, and each of the first accommodating groove and the second accommodating groove having at least a top opening and a side opening,
wherein the lower housing comprises a plurality of attraction members corresponding to each of the first accommodating groove and the second accommodating groove in terms of positions, attraction members of the plurality of attraction members corresponding to the first accommodating groove are configured to attract a stem of the left earphone, and attraction members of the plurality of attraction members corresponding to the second accommodating groove are configured to attract a stem of the right earphone,
wherein each of the first accommodating groove and the second accommodating groove comprises a first side wall face and a second side wall face, the first side wall face and the second side wall face have an included angle, the plurality of attraction members corresponding to each of the first accommodating groove and the second accommodating groove respectively comprise a first attraction member opposite to the first side wall face and a second attraction member opposite to the second side wall face,
wherein the first side wall face and the second side wall face are connected with each other to define the side opening,
wherein the first attraction member corresponding to the first accommodating groove and the first attraction member corresponding to the second accommodating groove are mirror-symmetrical,
wherein each attraction member of the plurality of attraction members is a magnet, a magnetic pole direction of the respective first attraction member is perpendicular to a plane of the respective first side wall face, so that a first magnetic pole of the respective first attraction member faces toward the side opening and a second magnetic pole of the respective first attraction member faces away from the side opening, and a magnetic pole direction of the respective second attraction member is parallel to a plane of the respective second side wall face, so that both a first magnetic pole and a second magnetic pole of the respective second attraction member have a side facing toward the side opening.

2. The earphone case according to claim 1, wherein the lower housing has a boss located between the first accommodating groove and the second accommodating groove, so as to partially separate the first accommodating groove from the second accommodating groove.

3. The earphone case according to claim 1, wherein each of the first accommodating groove and the second accommodating groove has a first bottom wall face and a second bottom wall face, the first bottom wall face is higher than the second bottom wall face,
- the first bottom wall face of the first accommodating groove is configured to abut with an ear bud of the left earphone, and the second bottom wall face of the first accommodating groove is configured to support a bottom of the stem of the left earphone,
- the first bottom wall face of the second accommodating groove is configured to abut with an ear bud of the right earphone, and the second bottom wall face of the second accommodating groove is configured to support a bottom of the stem of the right earphone.

4. The earphone case according to claim 3, wherein the top opening of each of the first accommodating groove and the second accommodating groove comprises a first opening portion corresponding to the first bottom wall face and a second opening portion corresponding to the second bottom wall face, and an edge of the first opening portion is farther away from a central axis of the earphone case than an edge of the second opening portion.

5. The earphone case according to claim 1, wherein an outer edge of the lower housing has a first fitting face, the first fitting face is oblique relative to a plane orthogonal to a height direction of the lower housing, the upper housing has a second fitting face, the second fitting face is configured to be fitted with the first fitting face, and when the second fitting face is fitted with the first fitting face, the first fitting face is parallel to the second fitting face.

6. The earphone case according to claim 5, wherein the first fitting face is inclined downwards in an inward direction.

7. A wireless earphone, comprising:
a left earphone and a right earphone; and
an earphone case comprising:
- an upper housing; and
- a lower housing, the upper housing being connected to the lower housing, the lower housing having a first accommodating groove and a second accommodating groove, the first accommodating groove and the second accommodating groove being configured to accommodate the left earphone and the right earphone, respectively, and each of the first accommodating groove and the second accommodating groove having at least a top opening and a side opening,
wherein the lower housing comprises a plurality of attraction members corresponding to each of the first accommodating groove and the second accommodating groove in terms of positions, attraction members of the plurality of attraction members corresponding to the first accommodating groove are configured to attract a stem of the left earphone, and attraction members of the plurality of attraction members corresponding to the second accommodating groove are configured to attract a stem of the right earphone,
wherein the left earphone and the right earphone are fitted in the first accommodating groove and the second accommodating groove, respectively, the stem of the left earphone comprises a first magnetic member configured to attract the attraction members of the plurality of attraction members corresponding to the first accommodating groove, and the stem of the right earphone comprises a second magnetic member configured to attract the attraction members of the plurality of attraction members corresponding to the second accommodating groove,
wherein each of the first accommodating groove and the second accommodating groove comprises a first side wall face and a second side wall face, the first side wall face and the second side wall face have an included angle, the plurality of attraction members corresponding to each of the first accommodating groove and the second accommodating groove respectively comprise a first attraction member opposite to the first side wall face and a second attraction member opposite to the second side wall face,
wherein the first side wall face and the second side wall face are connected with each other to define the side opening,
wherein each of the first accommodating groove and the second accommodating groove has a first bottom wall face and a second bottom wall face, the first bottom wall face is higher than the second bottom wall face,
the first bottom wall face of the first accommodating groove is configured to abut with an ear bud of the left earphone, and the second bottom wall face of the first accommodating groove is configured to support a bottom of the stem of the left earphone,
the first bottom wall face of the second accommodating groove is configured to abut with an ear bud of the right earphone, and the second bottom wall face of the first accommodating groove is configured to support a bottom of the stem of the right earphone.

8. The wireless earphone according to claim 7, wherein the first attraction member corresponding to the first accommodating groove and the first attraction member corresponding to the second accommodating groove are mirror-symmetrical.

9. The wireless earphone according to claim 8, wherein each attraction member of the plurality of attraction members is a magnet, a magnetic pole direction of the respective first attraction member is perpendicular to a plane of the respective first side wall face, so that a first magnetic pole of the respective first attraction member faces toward the side opening and a second magnetic pole of the respective first attraction member faces away from the side opening, and a magnetic pole direction of the respective second attraction member is parallel to a plane of the respective second side wall face, so that both a first magnetic pole and a second magnetic pole of the respective second attraction member have a side facing toward the side opening.

10. The wireless earphone according to claim 9, wherein the first magnetic pole of the first attraction member corresponding to the first accommodating groove is opposite to a first magnetic pole of the first magnetic member, and the first magnetic pole and the second magnetic pole of the second attraction member corresponding to the first accommodating groove are opposite to the first magnetic pole and a second magnetic pole of the first magnetic member, respectively;
the first magnetic pole of the first attraction member corresponding to the second accommodating groove is opposite to a first magnetic pole of the second magnetic member, and the first magnetic pole and the second magnetic pole of the second attraction member corresponding to the second accommodating groove are opposite to the first magnetic pole and a second magnetic pole of the second magnetic member, respectively.

11. The wireless earphone according to claim 9, wherein the magnetic poles of the first magnetic member are opposite to the magnetic poles of the second magnetic member.

12. The wireless earphone according to claim 7, wherein the lower housing has a boss, and the boss is arranged between the first accommodating groove and the second accommodating groove, so as to partially separate the first accommodating groove from the second accommodating groove.

13. The wireless earphone according to claim 7, wherein the top opening of each of the first accommodating groove and the second accommodating groove comprises a first opening portion corresponding to the first bottom wall face and a second opening portion corresponding to the second bottom wall face, and an edge of the first opening portion is farther away from a central axis of the earphone case than an edge of the second opening portion.

14. The wireless earphone according to claim 7, wherein an outer edge of the lower housing has a first fitting face, the first fitting face is oblique relative to a plane orthogonal to a height direction of the lower housing, the upper housing has a second fitting face, the second fitting face is configured to be fitted with the first fitting face, and when the second fitting face is fitted with the first fitting face, the first fitting face is parallel to the second fitting face.

15. The wireless earphone according to claim 7, wherein each of the first accommodating groove and the second accommodating groove is a profiled groove, the left earphone is fitted with a groove wall face of the first accommodating groove in a profiled manner, and the right earphone is fitted with a groove wall face of the second accommodating groove in a profiled manner.

16. An earphone case, comprising:
an upper housing; and
a lower housing, the upper housing being connected to the lower housing, the lower housing having a first accommodating groove and a second accommodating groove, the first accommodating groove and the second accommodating groove being configured to accommodate a left earphone and a right earphone, respectively, and each of the first accommodating groove and the second accommodating groove having at least a top opening and a side opening,
wherein the lower housing comprises a plurality of attraction members corresponding to each of the first accommodating groove and the second accommodating groove in terms of positions, attraction members of the plurality of attraction members corresponding to the first accommodating groove are configured to attract a stem of the left earphone, and attraction members of the plurality of attraction members corresponding to the second accommodating groove are configured to attract a stem of the right earphone,
wherein each of the first accommodating groove and the second accommodating groove comprises a first side wall face and a second side wall face, the first side wall face and the second side wall face have an included angle, the plurality of attraction members corresponding to each of the first accommodating groove and the second accommodating groove respectively comprise a first attraction member opposite to the first side wall face and a second attraction member opposite to the second side wall face,
wherein the first side wall face and the second side wall face are connected with each other to define the side opening,
wherein each of the first accommodating groove and the second accommodating groove has a first bottom wall face and a second bottom wall face, the first bottom wall face is higher than the second bottom wall face,
the first bottom wall face of the first accommodating groove is configured to abut with an ear bud of the left earphone, and the second bottom wall face of the first accommodating groove is configured to support a bottom of the stem of the left earphone,
the first bottom wall face of the second accommodating groove is configured to abut with an ear bud of the right earphone, and the second bottom wall face of the second accommodating groove is configured to support a bottom of the stem of the right earphone.

* * * * *